April 19, 1932.　　　　T. HAUSCH　　　　1,854,792
ELECTRICITY METER
Filed Feb. 20, 1930

Inventor:
Theodor Hausch
John D. Morgan

Patented Apr. 19, 1932

1,854,792

UNITED STATES PATENT OFFICE

THEODOR HAUSCH, OF ZUG, SWITZERLAND, ASSIGNOR TO LANDIS & GYR, A-G., A CORPORATION OF SWITZERLAND

ELECTRICITY METER

Application filed February 20, 1930, Serial No. 429,963, and in Switzerland February 21, 1929.

The present invention relates to improvements in electricity meters and more specifically to an induction meter particularly adapted for the measurement of reactive components.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations, and improvements herein shown and described.

The accompanying drawings, referred to herein and constituting a part hereof, illustrate one embodiment of the invention, and together with the description, serve to explain the principles of the invention.

Of the drawings:—

The present invention has for its object the provision of an induction meter, particularly adapted for the measurement of electrical energy at low frequencies, as well as the provision of a reactive component meter which can be easily and quickly adjusted to give an extremely accurate registration of the quantity measured.

Heretofore, in the measurement of the reactive component, very great disadvantages have been encountered. Many of the systems proposed require an accurate control of the line voltage while others are not independent of the rotary field and the field must rotate in a predetermined direction in order to secure correct registration. The present invention is principally an improvement upon the general type of meter shown in the prior patent to Beusch No. 1,734,109, although certain features of the present invention are applicable to other types of meters.

The present invention provides an induction meter particularly adapted for use in the measurement of reactive component, and in the illustrative embodiment of the present invention, a resistance is shunted across the current coil while the voltage coil is tapped, and one end thereof, as well as the tap, are connected by parallel resistances in series with the voltage coil, one of said resistances being variable. Preferably, the voltage induced in the tapped portion of the coil will react to cause the potential drop in the resistance in series with the tap on the voltage coil to combine with the coil voltage so as to cause a phase angle displacement of the coil voltage relative to the line voltage without changing its magnitude. Preferably and as embodied, although not necessarily, ohmic resistances are employed in connection with the present invention.

Although the present invention is shown in connection with a single-phase integrating meter for the measurement of reactive component, the invention is not so limited and is also applicable to polyphase meters as well as to watt and watt hour meters.

Figure 1:
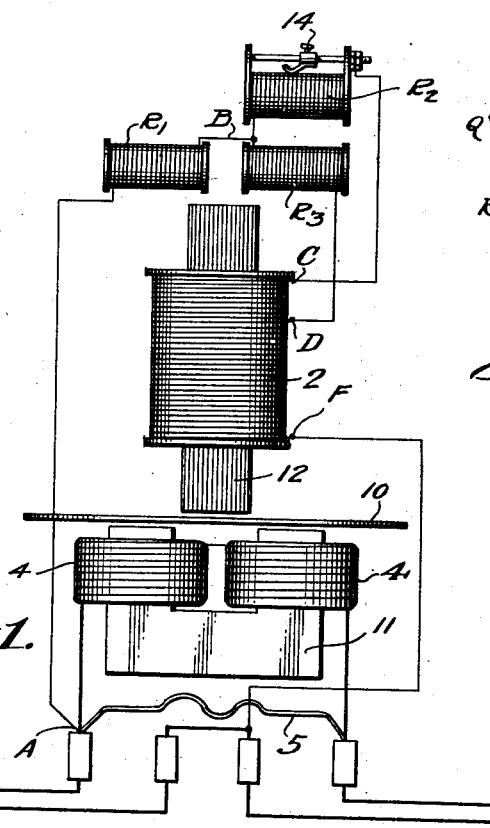
Fig. 1 is a front elevation diagrammatically showing the present preferred and illustrative embodiment of the invention.

Referring now in detail to the present preferred embodiment of the invention, diagrammatically illustrated by Fig. 1 of the drawings, the invention is shown in connection with, and as applied to an integrating reactive component meter of the general type shown in the Beusch patent, which includes the usual metering disc 10 adapted to be driven proportionately to the reactive component of the metered circuit by means of the current coils 2 and core 11 and voltage coil 2 and core 12.

In accordance with the disclosure of the patent referred to, there is preferably provided a resistance 5 shunted across the terminals of the current coils 4 and a separate resistance $R_1$ is also preferably provided in series with the voltage coil 2 of the meter.

In accordance with the present invention and for the purpose of facilitating the adjustment of the meter, the voltage coil is tapped intermediate its ends, and two parallel resistances are provided between the resistance $R_1$ and the voltage coil 2, one of said resistances $R_3$ being connected to the coil 2 at the tap D, while the other of said resistances $R_2$ is connected with the terminal C of the coil.

One of the resistances $R_2$ and $R_3$ is preferably easily variable, and, as shown in the accompanying drawings, resistance $R_2$ is provided with a slide 14 whereby the resistance may be varied as desired. Means are preferably provided permitting the quick and accurate adjustment of this variable resistance while the meter is in operation, and without danger to the operator.

Figure 2:
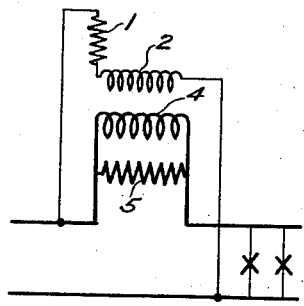
Fig. 2 is a diagram showing the basic circuit of the illustrative embodiment.

Fig. 2 of the accompanying drawings diagrammatically illustrates the basic type of reactive component meter which will be used in connection with the description of the present invention, this meter including a voltage coil 2 connected in series with a resistance 1, and a current coil 4 connected in parallel with a resistance 5, this being the general type of meter described in the patent above-referred to.

Figure 3:
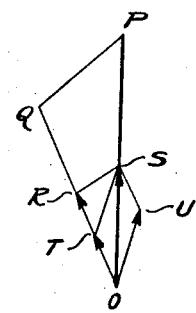
Fig. 3 is a vector diagram of the meter illustrated in Fig. 2.

Figure 3 is a vector diagram of the circuit of the meter shown in Figure 2, and in this diagram, OP is the vector corresponding to the terminal voltage of the meter while OQ is the voltage component at the resistance 1. QP indicates the voltage component in the voltage coil 2 of this meter, and OR represents the active voltage flux. In this diagram, it has been assumed that the current in the circuit is in phase with the voltage and is represented by the vector OS, superimposed on the vector OP. This current OS may be divided into two partial currents $OT=I_4$ and $OU=I_5$, the current $I_5$ flowing through the parallel resistance 5, while the current $I_4$ flows through the current coil 4. It is therefore clear that this arrangement makes possible the bringing of the current and the current flux into phase coincidence with the active voltage flux, or upon reversal of the active voltage flux through an angle of 180°, it is possible to bring the two into phase opposition. Generally, however, owing to iron losses, these fluxes will not be exactly in coincidence with the currents and the necessary equalizations must always be so effected as to create the conditions required by the driving fluxes. For the sake of simplicity in the showing of Fig. 3, the assumption has been made that the fluxes are exactly in phase coincidence with the currents.

Figures 4, 5:
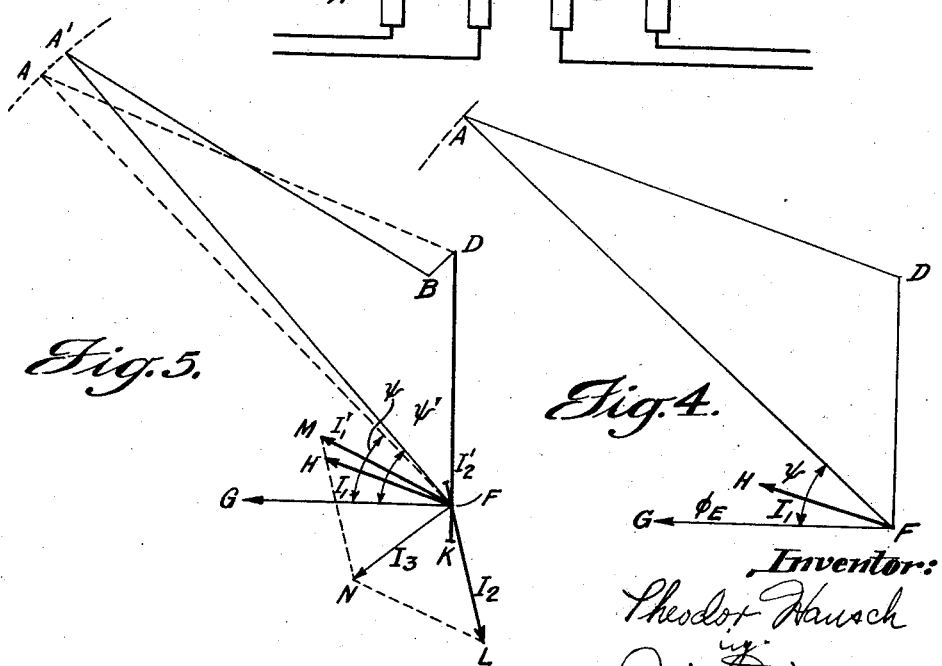
Figs. 4 and 5 are vector diagrams representing the different conditions of the illustrative embodiment of the invention shown in Fig. 1.

Figure 4 is a vector diagram representing the conditions obtaining in the present preferred and illustrative embodiment of the invention shown in Fig. 1 of the drawing, when the resistance $R_2$ is cut out. In this case the resistance of $R_2$ is infinity, $I_2=0$ and $I_1=I_3$. In this diagram, the vectors correspond with those of Fig. 2, but are arranged in a different manner. In Figures 4 and 5, the end points of the vectors are designated with characters corresponding to points on Fig. 1, and for the sake of simplicity in these diagrams, it is assumed that the ohmic resistance of the voltage coil 4 is combined with the resistance in series with the voltage coil.

The voltage DF leads the voltage flux $FG=\varphi E$ by 90°, and the current $FH=I_1$ and is displaced relative to the voltage less than 90° since a suitable allowance must be made for the iron losses occurring in the meter. $I_1$ causes a potential drop DA in the resistances $R_1$ and $R_3$, which potential drop is parallel to the current vector, and is so shown in Fig. 4. AF represents the line or terminal voltage impressed upon the voltage circuit of the meter, and the voltage flux is displaced and lags behind the line or terminal voltage by the angle $\psi$.

Figure 5 of the drawings is a vector diagram illustrating the conditions obtaining in the meter when the resistance $R_2$ has a finite value, and, therefore, by effecting a variation in the resistance $R_2$ inductive regulation is effected. In any event, an electro motive force is induced in the windings CD of the voltage coil by the current flowing in the windings DF of the same coil, and in Figure 5 of the drawings, this electromotive force is vectorially designated by FK and lags $FG=\varphi E$ by 90°. This electromotive force produced a current in the circuit DCB which current I lags the inducing voltage. Of this current, $FL=I_2$ induces in the voltage coil DF an opposing current $FL'=I'_2$. The magnitude of $I_2$ is a function of the turns of the coils CD and DF, and may be represented by the equation:

$$I'_2 : I_2 = CD \text{ turns} : DF \text{ turns}.$$

This current $I'_2$ is added together with the current $I_1$ to give the current $FM=I'_1$ flowing in the coil. The current also flows through the resistance $R_1$, but in $R_3$ there flows a current equal to the sum of $I_2$ and $I'_1$. The voltage FD is equal to that shown in connection with Fig. 4, and therefore the flux $\varphi E$ is constant. Considering now the terminal or line voltage, there must be added to the voltage FD the potential drop in the resistance $R_3$, and in the diagram of Fig. 5 this is indicated by the vector $DB=I_3.R_3$. Furthermore, there is the ohmic potential drop $I_1R_1=BA'$, so that the vector of the line or terminal voltage is now FA'. The phase angle between the line voltage FA' and the voltage flux is the angle $\psi'$. From the foregoing, it is clear that by suitably choosing the resistances it is possible to keep the voltage constant in the voltage coil, and only the phase displacement of the latter, relative to the line voltage, is varied.

The foregoing represents applicant's present conception of the theory underlying the operation of the illustrative embodiment of the present invention, and while the invention is not at all dependent upon this theory of operation, this theoretical explanation has been amply confirmed by exhaustive tests including the changing of the resistance $R_2$ from 0 to infinity with a phase displacement angle of 90° (cos $\varphi=0$ or sin $\varphi=1.0$) this change producing a change in the torque of only 0.2%. With a phase displacement angle of 30° (cos $\varphi=.866$ or sin $\varphi=.5$) there resulted change of 20% in the torque of the meter when the resistance was similarly changed. This large change in the torque is therefore due to a change in the phase displacement angle between the driving fluxes. These tests on this meter have also shown that the meter is only slightly affected by changes in frequency and/or voltage, and that the temperature error of the meter is very small.

The invention in its broader aspects is not limited to the specific mechanisms shown and described but departures may be made therefrom within the scope of the accompanying claims without departing from the principles of the invention and without sacrificing its chief advantages.

What I claim is:—

1. An induction meter including in combination a meter disc, a current coil, a voltage coil, a resistance shunted across the current coil, parallel resistances connected with the voltage coil, one of said parallel resistances being connected intermediate the ends of said voltage coil, and one of said resistances being variable.

2. An induction meter including in combination a meter disc, a current coil and core, a voltage coil and core, a resistance shunted across the current coil, parallel resistances connected with the voltage coil, one of said resistances being connected to one end of the voltage coil, the other resistance being connected intermediate the ends of said voltage coil, and one of said resistances being variable.

3. An induction meter including in combination a meter disc, a current coil, a voltage coil, a resistance shunted across the current coil, parallel resistances connected with the voltage coil, one of said parallel resistances being connected intermediate the ends of said voltage coil, and means for varying one of said resistances in the pressure circuit.

4. A reactive component meter including in combination a meter disc, a current coil and core, a voltage coil and core, a resistance shunted across the current coil, parallel resistances connected in series with the voltage coil, one of said resistances being connected intermediate the ends of said voltage coil, and one of said resistances being adjustable.

5. A reactive component meter including in combination a meter disc, a current coil, a voltage coil, a resistance shunted across the current coil, parallel resistances connected with the voltage coil, one of said resistances being connected to one end of the voltage coil, the other resistance being connected intermediate the ends of said voltage coil, and means for varying one of said parallel resistances in the pressure circuit.

6. A reactive component meter including in combination a meter disc, a current coil and core, a voltage coil and core, an ohmic resistance shunted across the current coil, parallel ohmic resistances connected with the voltage coil, one of said parallel resistances being connected to one end of the voltage coil, the other resistance being connected intermediate the ends of said voltage coil, and one of said resistances being variable.

7. A reactive component meter including in combination a meter disc, a current coil and core, a voltage coil and core, a resistance shunted across the current coil, parallel resistances connected with the voltage coil, one of said parallel resistances being connected to one end of the voltage coil, the other resistance being connected intermediate the ends of said voltage coil, and one of said resistances being variable.

8. A reactive component meter including in combination a meter disc, a current coil and core, a voltage coil and core, an ohmic resistance shunted across the current coil, parallel ohmic resistances connected with the voltage coil, one of said parallel resistances being connected to one end of the voltage coil, the other resistance being connected intermediate the ends of said voltage coil, and one of said resistances being variable, and a resistance in series with said parallel resistances and pressure coil.

In testimony whereof, I have signed my name to this specification.

THEODOR HAUSCH.